United States Patent
Park (10) Patent No.: US 10,656,856 B2
(45) Date of Patent: May 19, 2020

(54) DATA ACCESS APPARATUS USING MEMORY DEVICE WHEREIN 24-BIT DATA IS DIVIDED INTO THREE SEGMENTS THAT HAS PREDETERMINED ADDRESSES MAPPED TO ADDRESSES OF SINGLE 8-BIT DEVICE

(71) Applicant: LSIS CO., LTD., Gyeonggi-do (KR)

(72) Inventor: Tae-Bum Park, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 276 days.

(21) Appl. No.: 15/209,643

(22) Filed: Jul. 13, 2016

(65) Prior Publication Data

US 2017/0017425 A1    Jan. 19, 2017

(30) Foreign Application Priority Data

Jul. 13, 2015   (KR) ................. 10-2015-0098851

(51) Int. Cl.
   *G06F 3/06*      (2006.01)
   *G06F 12/06*     (2006.01)
   *G06F 12/04*     (2006.01)

(52) U.S. Cl.
   CPC .......... *G06F 3/0638* (2013.01); *G06F 3/0604* (2013.01); *G06F 3/0673* (2013.01); *G06F 12/04* (2013.01); *G06F 12/06* (2013.01)

(58) Field of Classification Search
   CPC combination set(s) only.
   See application file for complete search history.

(56) References Cited

U.S. PATENT DOCUMENTS

| 4,307,447 A |   | 12/1981 | Provanzano et al. |
| 5,822,753 A | * | 10/1998 | Takano ............... G06F 13/1636 |
|             |   |         | 711/106 |
| 6,081,442 A |   | 6/2000  | Igarashi et al. |
| 6,226,736 B1 |  | 5/2001  | Niot |

(Continued)

FOREIGN PATENT DOCUMENTS

| EP | 0 022 622 A1 | 1/1981 |
| JP | H3-209544 A  | 9/1991 |

(Continued)

OTHER PUBLICATIONS

Notice of Allowance dated Apr. 25, 2017 issued in corresponding Japanese Application No. 2016-135815.

(Continued)

*Primary Examiner* — William B Partridge
*Assistant Examiner* — Chie Yew
(74) *Attorney, Agent, or Firm* — K&L Gates LLP (57) ABSTRACT

In some embodiments, a data access apparatus includes a memory device including a plurality of addresses, an address mapping unit configured to map the addresses of the memory device with respective predetermined addresses such that they correspond to each other, a data division unit, a data mapping unit configured to map respective predetermined specific addresses in regions divided by the data division unit, and a control unit configured to control the data such that the data is stored in the addresses of the memory device mapped with the respective specific addresses in the regions divided by the data division unit.

3 Claims, 5 Drawing Sheets

(56) References Cited

U.S. PATENT DOCUMENTS

| | | | |
|---|---|---|---|
| 6,931,462 B2 | 8/2005 | Lee | |
| 7,554,874 B2 | 6/2009 | Choi | |
| 7,681,013 B1* | 3/2010 | Trivedi | G06F 9/30032 |
| | | | 341/67 |
| 8,098,739 B2 | 1/2012 | Kosuge | |
| 8,356,225 B2 | 1/2013 | Kim et al. | |
| 2001/0009539 A1* | 7/2001 | Ogasawara | G11B 20/10 |
| | | | 369/59.25 |
| 2004/0128444 A1* | 7/2004 | Baek | G06F 3/0613 |
| | | | 711/114 |
| 2004/0136273 A1 | 7/2004 | Chambers | |
| 2005/0160216 A1* | 7/2005 | Norman | G06F 12/0661 |
| | | | 711/5 |
| 2007/0033323 A1 | 2/2007 | Gorobets | |
| 2010/0082917 A1* | 4/2010 | Yang | G06F 12/0246 |
| | | | 711/157 |
| 2012/0179869 A1* | 7/2012 | Flynn | G06F 3/0613 |
| | | | 711/114 |
| 2012/0320679 A1* | 12/2012 | Sprouse | G11C 7/1015 |
| | | | 365/185.12 |
| 2013/0151761 A1 | 6/2013 | Kim et al. | |
| 2014/0047163 A1 | 2/2014 | Kwak | |
| 2014/0297921 A1* | 10/2014 | Chang | G06F 12/0246 |
| | | | 711/103 |
| 2014/0379960 A1 | 12/2014 | Linkewitsh | |
| 2015/0127885 A1 | 5/2015 | Yeh | |
| 2015/0186270 A1* | 7/2015 | Peng | G11C 16/16 |
| | | | 711/3 |

FOREIGN PATENT DOCUMENTS

| | | |
|---|---|---|
| JP | H3-241443 | 10/1991 |
| JP | 2008-141278 A | 6/2008 |
| JP | 2011-145755 A | 7/2011 |
| JP | 2013-120600 A | 6/2013 |
| JP | 2014-35786 A | 2/2014 |
| JP | 2015-75931 A | 4/2015 |
| KR | 2004-0011665 A | 2/2004 |
| KR | 2005-0066502 A | 6/2005 |
| KR | 2007-0037536 A | 4/2007 |
| KR | 2008-0051267 A | 6/2008 |
| KR | 2011-0068103 A | 6/2011 |

OTHER PUBLICATIONS

European Search Report dated Aug. 8, 2016 issued in corresponding European Application No. 16 172 469.5.
Anonymous; "DSP56300 Family Manual: Chapter 10 DMA Controller"; Apr. 2, 2002; XP055448478; retrieved Feb. 2, 2018; URL: http://ecee.colorado.edu/~ecen4002/manuals/dsp56300family/ch10-dma.pdf.
European Search Report for related European Application No. 16172469.5; report dated Feb. 21, 2018; (7 pages).

* cited by examiner

FIG. 1

PRIOR ART

DATA ACCESS APPARATUS USING MEMORY DEVICE WHEREIN 24-BIT DATA IS DIVIDED INTO THREE SEGMENTS THAT HAS PREDETERMINED ADDRESSES MAPPED TO ADDRESSES OF SINGLE 8-BIT DEVICE

CROSS REFERENCE TO RELATED APPLICATIONS

This application claims the benefit of Korean Patent Application No. 10-2015-0098851, filed on Jul. 13, 2015 and entitled "DATA ACCESS APPARATUS USING MEMORY DEVICE", which is hereby incorporated by reference in its entirety.

BACKGROUND

Technical Field

The present disclosure relates to a data access apparatus, and more particularly, to a data access apparatus using a memory device, capable of allowing 16-bit or more data to be easily read/written using one 8-bit memory device.

Description of the Related Art

In general, a CPU (central processing unit), which executes the overall control of an electronic control system, performs an access process of reading or writing data from or to a memory device as a storage device.

That is, the access process of reading/writing data from/to the memory device is mainly performed by the CPU. Accordingly, the read or write operation means that reading or writing is performed on the basis of the CPU. The read operation refers to bringing data in the memory device to the CPU, and the write operation refers to transmit data from the CPU to the memory device.

Meanwhile, a solar inverter system, which has been recently spotlighted from among electronic control system, is a system which generates electricity by converting DC energy supplied from a solar module into AC energy.

When the solar inverter system is operated, a variety of types of information such as a voltage, a current, and an amount of power generation are stored in a memory device and the information stored in the memory device is stored in external devices (e.g. a monitoring device) through communication.

The amount of power generation in the solar inverter system is very important data, and the cumulative amount of power generation (i.e. the total amount of power generation to date from when electricity is generated by the solar inverter system) is very important information for a user.

Meanwhile, existing 8-bit and 16-bit memory devices may maximally record 256 and 65,536 data words, respectively. These capacities of the memory devices are too small to display the cumulative amount of power generation in megawatts. Thus, at least 24-bit memory device (which maximally records 16,777,216 data words) must be used to display the cumulative amount of power generation in megawatts. Therefore, there is a need for the method of storing 24-bit data in the commercial 8-bit memory device.

Due to the recent development of communication methods and devices, the amount of data, which may be transferred to the external device of the solar inverter system at a time, is increased as in data of 8 bits, 16 bits, or 24 bits. In addition, the amount of data transferred to the user through communication is gradually increased. Nevertheless, there is no occurrence of deterioration of communication speed.

However, 8-bit memory devices (particularly, nonvolatile memory devices) are mainly used to store data exchanged through communication, and 24-bit memory devices are expensive.

In addition, since the commercial 8-bit memory device must be used when important data is read/written from/in the memory device in the solar inverter system, the volume of data is limited to 8 bits. In addition, a 24-bit memory device must be purchased in the market in order for 24-bit data to be read/written, but the 24-bit memory device is expensive.

The 8-bit memory device (the commercial memory devices) is mainly used in the solar inverter system. The 8-bit memory device is generally used and cheap.

When important data (e.g. a cumulative amount of power generation) of the solar inverter system is stored using the commercial 8-bit memory device, only 8-bit data may be stored due to the limited capacity (8 bits) of the memory device.

SUMMARY

It is an aspect of some embodiments of the present disclosure to provide a data access apparatus using a memory device, capable of allowing 16-bit or more data to be easily read/written using one 8-bit memory device.

The present disclosure is not limited to the above aspect and other aspects of the present disclosure will be clearly understood by those skilled in the art from the following description.

In accordance with an aspect of some embodiments of the present disclosure, a data access apparatus using a memory device includes a memory device including a plurality of addresses so that data is readable or writable, an address mapping unit to divide the addresses of the memory device into N parts (where N is a natural number equal to or greater than 2) defined as first to $N^{th}$ regions, and to map the addresses of the memory device with respective predetermined addresses in the first to $N^{th}$ regions such that they correspond to each other, a data division unit to divide M-bit data (where M is a natural number equal to or greater than 2) into N parts defined as first to $N^{th}$ segments of data, a data mapping unit to map the first to $N^{th}$ segments of data divided by the data division unit with respective predetermined specific addresses in the first to $N^{th}$ regions, and a control unit to control the first to $N^{th}$ segments of data divided by the data division unit such that the first to $N^{th}$ segments of data are stored in the addresses of the memory device mapped with the respective specific addresses in the first to $N^{th}$ regions.

The data access apparatus may further include a data restoration unit to restore an original M-bit data by combining the first to $N^{th}$ segments of data stored in the addresses of the memory device mapped with the respective specific addresses in the first to $N^{th}$ regions.

The address mapping unit may divide the addresses of the memory device into N parts according to setting of a user so that the N parts are defined as first to $N^{th}$ regions.

The data division unit may divide the M-bit data into N parts defined as first to $N^{th}$ segments of data.

The respective specific addresses in the first to $N^{th}$ regions may be addresses located in the same order or a random order according to setting of a user.

The memory device may be an 8-bit memory device, and the data access apparatus may be performed in any one of cases of N=2 and M=16, N=3 and M=24, and N=4 and M=32.

DETAILED DESCRIPTION

Hereinafter, embodiments of the present disclosure will be described in detail with reference to the accompanying drawings. It should be understood that the present disclosure is not limited to the following embodiments, and that the embodiments are provided for illustrative purposes only. The scope of the disclosure should be defined only by the accompanying claims and equivalents thereof.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 1:
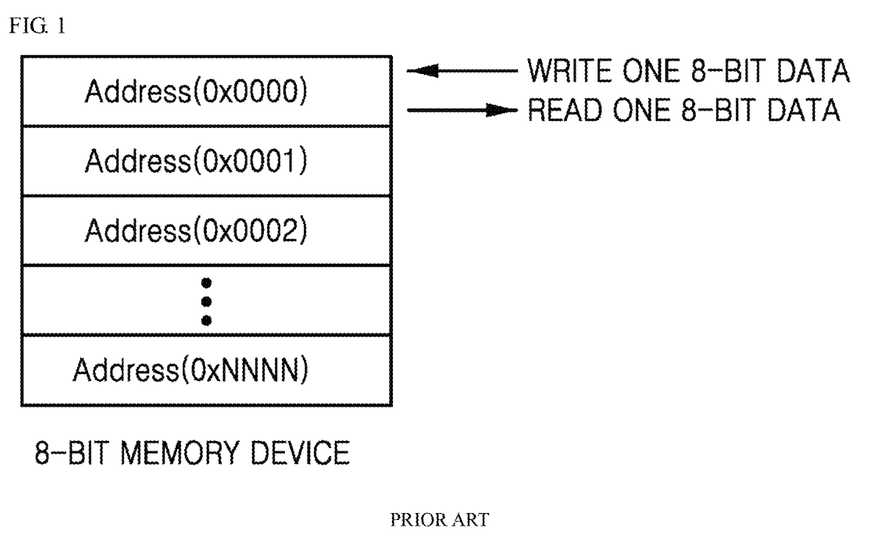
FIG. 1 is a diagram for explaining a method of reading/writing 8-bit data from/in an 8-bit memory device according to the prior art.

FIG. 1 is a diagram for explaining a method of reading/writing 8-bit data from/in an 8-bit memory device according to the prior art. One 8-bit memory device has addresses of 0x0000 to 0xNNNN. Accordingly, 8-bit data is written and stored in each address of the memory device, and is read therefrom if necessary.

Figure 2:
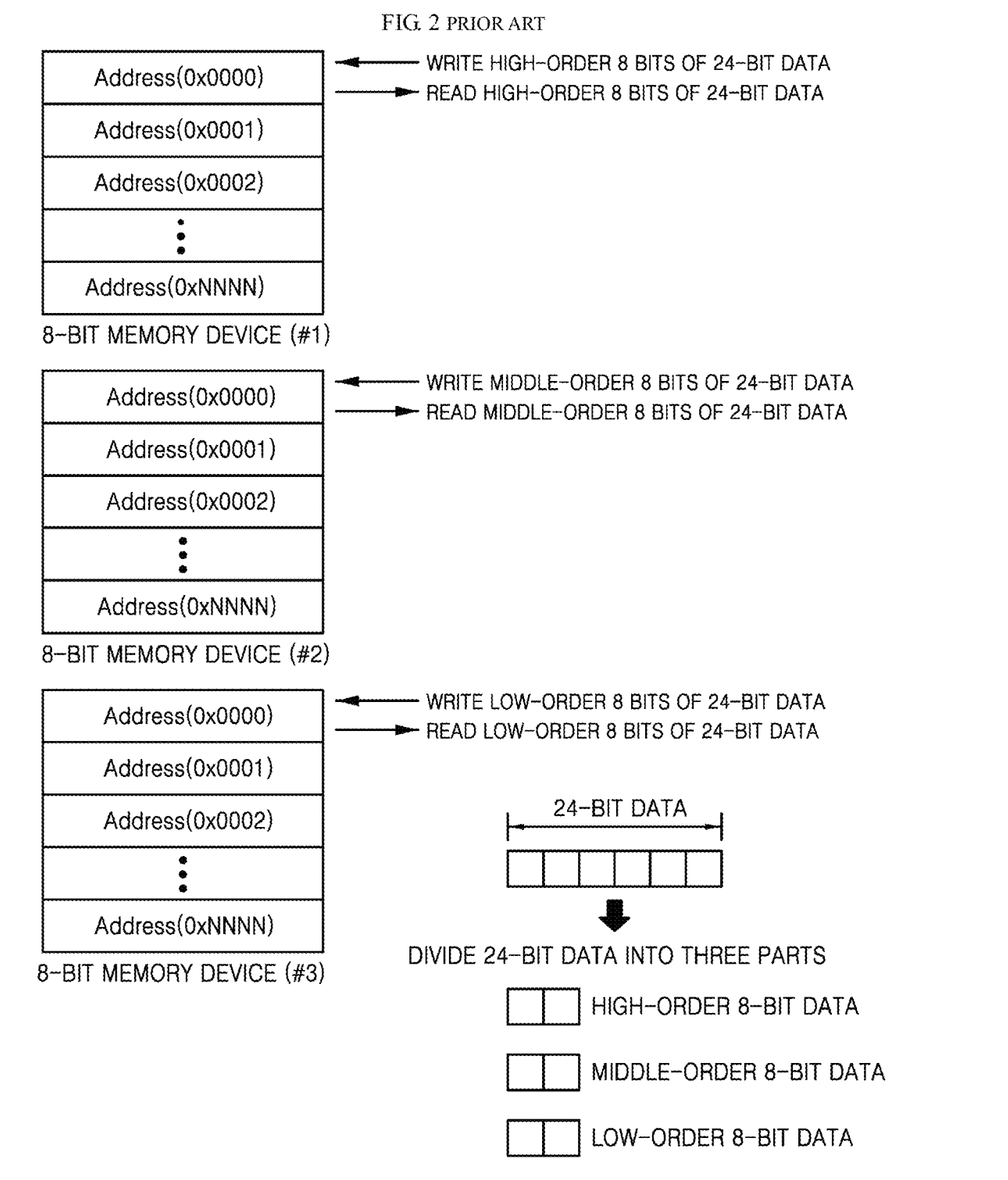
FIG. 2 is a diagram for explaining a method of reading/writing 24-bit data using a plurality of 8-bit memory devices according to the prior art.

FIG. 2 is a diagram for explaining a method of reading/writing 24-bit data using a plurality of 8-bit memory devices according to the prior art. For example, three 8-bit memory devices must be used when it is necessary to store 24-bit data in a solar inverter system.

The 24-bit data intended to be stored in the 8-bit memory devices in the solar inverter system is divided into three parts, e.g. three segments of 8-bit data. Next, the three divided segments of 8-bit data are respectively written in the 8-bit memory devices, and are read therefrom if necessary.

However, the related art is problematic in that data storable in the solar inverter system is limited to 8 bits, 24 bits, etc. according to respective capacities (8 bits, 24 bits, etc.) of memory devices to be used. That is, there are problems in that the volume of data which may be read/written from/in the memory devices to be used is determined according to the capacities thereof, and the commercial 8-bit and 16-bit memory devices are expensive.

In addition, 24-bit data may not be stored in the commercial 8-bit memory device. If 24-bit data is stored using any 8-bit memory device, three 8-bit memory devices must be used as illustrated in FIG. 2, which may lead to an increase in cost.

In order to resolve the above-mentioned problems, the technique of some embodiments of the present disclosure is characterized in that 16-bit or more data is easily read/written using one 8-bit memory device, for example, used in a solar inverter system.

In accordance with a data access apparatus using a memory device according to an embodiment of the present disclosure, it is possible to resolve the problem in that data storable in the solar inverter system of the related art is limited to 8 bits, 24 bits, etc. according to respective capacities (8 bits, 24 bits, etc.) of memory devices used therein. In addition, it is possible to resolve the problem in that the volume of data which may be read/written from/in the memory devices to be used is determined according to the capacities thereof.

That is, some embodiments of the present disclosure can access a large volume of data (e.g. 16 bits, 24 bits, or 32 bits) to a memory device which is cheap and has a small capacity (8 bits), and effectively reduce costs.

Figure 3:
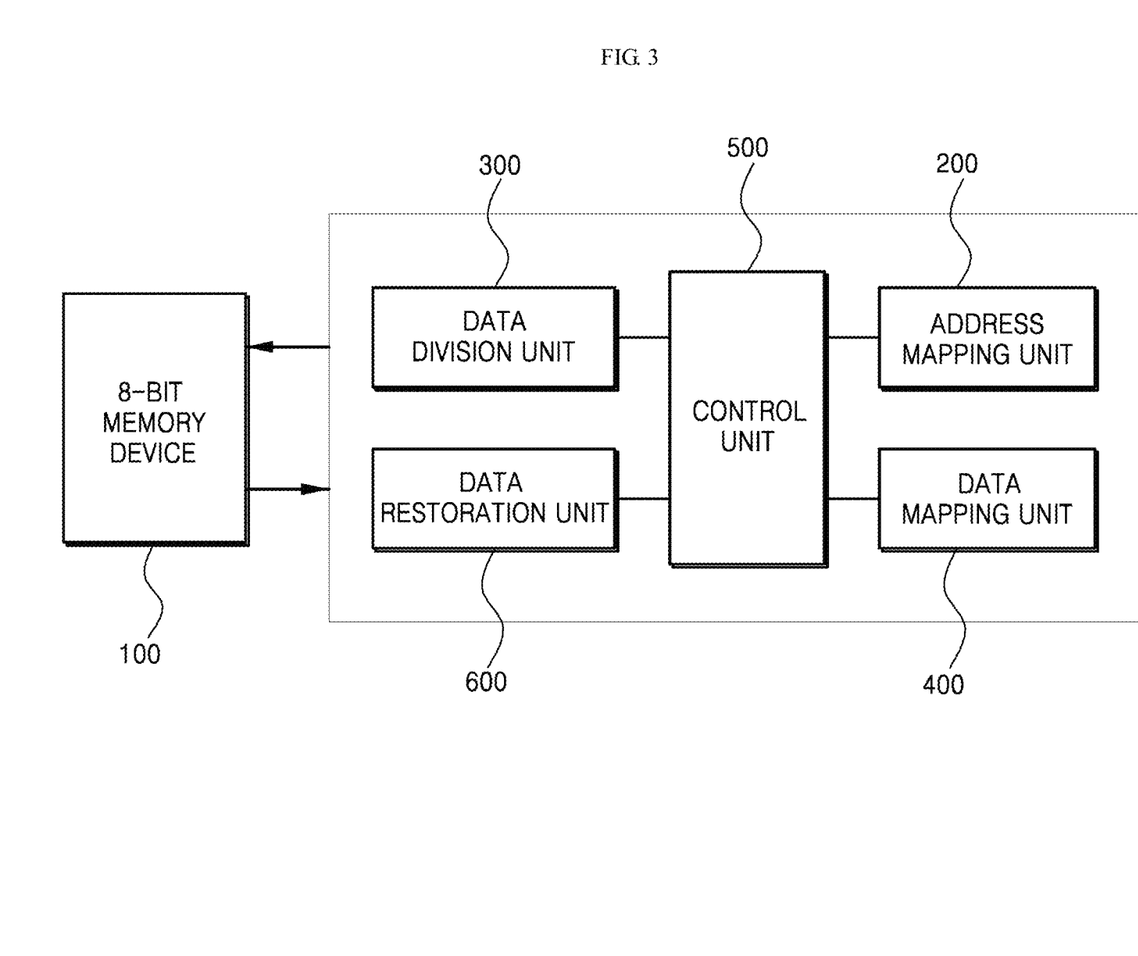
FIG. 3 is a block diagram for explaining a data access apparatus using a memory device according to an embodiment of the present disclosure.
Figure 4:
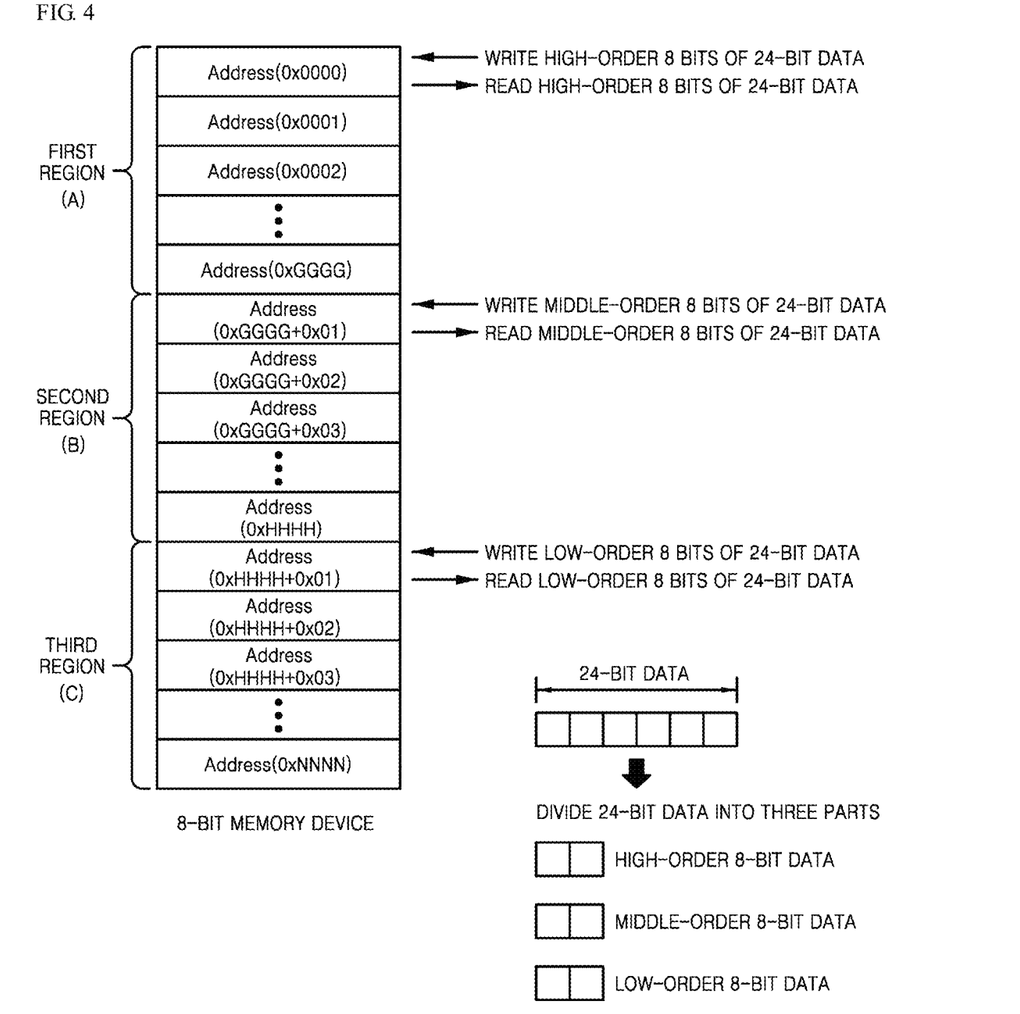
FIG. 4 is a diagram for explaining a method of reading/writing 24-bit data using one 8-bit memory device according to the embodiment of the present disclosure.

FIG. 3 is a block diagram for explaining a data access apparatus using a memory device according to an embodiment of the present disclosure. FIG. 4 is a diagram for explaining a method of reading/writing 24-bit data using one 8-bit memory device according to the embodiment of the present disclosure.

Referring to FIGS. 3 and 4, the data access apparatus using a memory device according to the embodiment of the present disclosure largely includes an 8-bit memory device 100, an address mapping unit 200, a data division unit 300, a data mapping unit 400, and a control unit 500.

Here, the 8-bit memory device 100 may be an IC (integrated circuit) including a plurality of addresses (e.g. addresses of 0x0000 to 0xNNNN) such that 8-bit data may be read or written.

The 8-bit memory device 100 has an address which designates each position of data, and a data bus as each transfer channel of data. In the case where data is read by the control unit 500, when the address of data to be read is transferred to the 8-bit memory device 100, the 8-bit memory device 100 loads data in the designated address on the data bus so that the control unit 500 reads the data. In the case where data is written, when a specific address is transferred to the 8-bit memory device 100, the data is written in the associated address of the 8-bit memory device 100.

The control unit 500 sends the address as the position information of the 8-bit memory device 100 to an address bus. When the 8-bit memory device 100 receives information on the address, data is read or written from or in the associated address.

Meanwhile, the 8-bit memory device 100 may continuously maintain the stored data information even though power is not supplied thereto. It is preferable that the 8-bit memory device 100 is a nonvolatile memory (NVM or NVRAM) in which a read/write operation may be performed. The nonvolatile memory may be one of, for example, a ROM, an EEPROM (Electrically Erasable Programmable Read-Only Memory), a flash memory, a phase change memory, a resistive memory, and a magnetic memory.

The address mapping unit 200 divides the addresses of the 8-bit memory device 100 into three parts defined as first to third regions A to C. Next, the address mapping unit 200 maps the addresses (0x0000 to 0xNNNN) of the 8-bit memory device 100 and respective predetermined addresses (0x000 to 0xGGGG, 0xGGGG+0x01 to 0xHHHH, and 0xHHHH+0x01 to 0xNNNN) in the first to third regions A to C such that they one-to-one correspond to each other.

As illustrated in FIG. 4, it is preferable that the address mapping unit 200 divides the addresses of the 8-bit memory device 100 into three parts in the order of addresses so that the parts are defined as first to third regions A to C, but the present disclosure is not limited thereto. For example, the addresses of the 8-bit memory device 100 may be randomly divided into three parts defined as first to third regions A to C.

The data division unit 300 divides 24-bit data into three parts by 8 bits so that it is divided into first to third segments of 8-bit data.

As illustrated in FIG. 4, it is preferable that the data division unit 300 sequentially divides 24-bit data into high-order 8-bit data, middle-order 8-bit data, and low-order 8-bit data by 8 bits such that it is divided into first to third segments of 8-bit data, but the present disclosure is not limited thereto. For example, 24-bit data may be randomly divided into three parts such as first to third segments of 8-bit data.

The data mapping unit 400 maps the first to third segments of 8-bit data, divided by the data division unit 300, and with respective predetermined specific addresses in the first to third regions A to C defined by the address mapping unit 200.

In this case, it is preferable that the respective specific addresses in the first to third regions A to C defined by the address mapping unit 200 are addresses located in the same order. For example, when the first 8-bit data is mapped in the address of "0x0000" which is first located in the first region A, the second 8-bit data and the third 8-bit data are respectively mapped in the addresses of O0GGGG+0x01 and 0xHHHH+0x01 which are first located in the respective second and third regions B and C.

Meanwhile, the respective specific addresses in the first to third regions A to C defined by the address mapping unit 200 may be addresses located in a different or random order according to the setting of the user.

The control unit 500 performs a control function such that the first to third segments of 8-bit data, divided by the data division unit 300, are stored in the addresses of the 8-bit memory device 100 mapped with the respective specific addresses in the first to third regions A to C defined by the address mapping unit 200.

Some embodiments of the present disclosure may further include a data restoration unit 600 which restores the original 24-bit data by combining the first to third segments of 8-bit data stored in the addresses of the 8-bit memory device 100 mapped with the respective specific addresses in the first to third regions A to C defined by the address mapping unit 200.

Meanwhile, it is preferable that the address mapping unit 200, the data division unit 300, the data mapping unit 400, and the data restoration unit 600 applied to the embodiment of the present disclosure are programmed in a software manner so as to be operated in the control unit 500 or a CPU, but the present disclosure is not limited thereto. For example, the address mapping unit 200, the data division unit 300, the data mapping unit 400, and the data restoration unit 600 may be separated from the control unit 500 or the CPU so as to be operated in a hardware manner.

Alternatively, the address mapping unit 200, the data division unit 300, the data mapping unit 400, the control unit 500, and the data restoration unit 600 applied to the embodiment of the present disclosure may be included in one CPU.

Hereinafter, a method of accessing data using the memory device according to the embodiment of the present disclosure will be described in detail.

Figure 5:
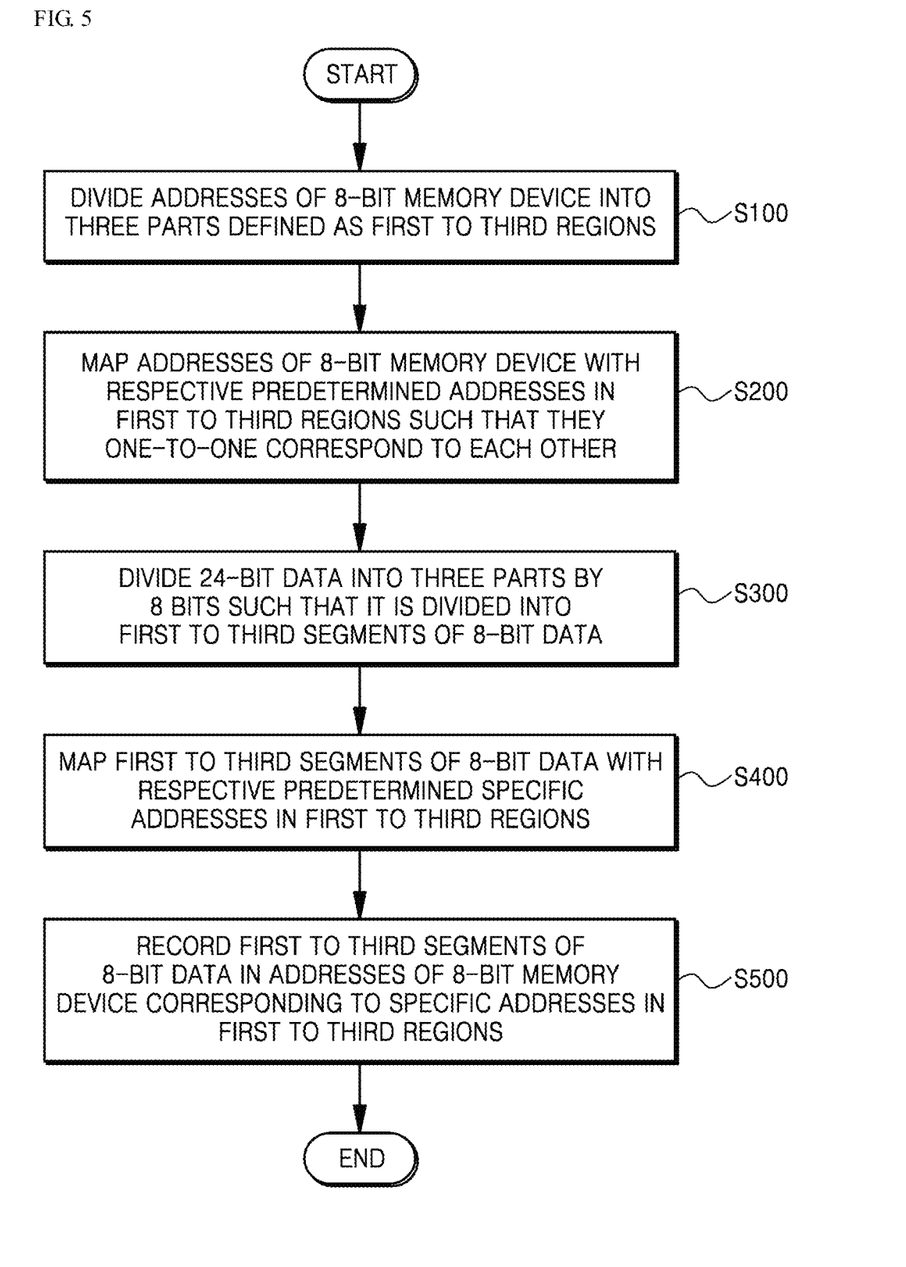
FIG. 5 is a flowchart illustrating a method of accessing data using the memory device according to the embodiment of the present disclosure.

FIG. 5 is a flowchart illustrating the method of accessing data using the memory device according to the embodiment of the present disclosure.

Referring to FIGS. 3 to 5, when 24-bit data is written in the 8-bit memory device 100 by the control unit 500 applied to the embodiment of the present disclosure, the addresses of the 8-bit memory device 100 are first divided into three parts defined as first to third regions A to C by the address mapping unit 200 (S100).

In this case, it is preferable that the addresses of the 8-bit memory device 100 are divided into three parts in the order of predetermined addresses so that the parts are defined as first to third regions A to C (see FIG. 4).

Next, the addresses of the 8-bit memory device 100 are mapped with respective predetermined addresses in the first to third regions A to C such that they one-to-one correspond to each other (S200). Next, 24-bit data to be stored is divided into three parts by 8 bits so as to be divided into first to third segments of 8-bit data by the data division unit 300 (S300).

In this case, it is preferable that 24-bit data is sequentially divided into high-order 8-bit data, middle-order 8-bit data, and low-order 8-bit data by 8 bits so as to be divided into first to third segments of 8-bit data.

Next, the first to third segments of 8-bit data divided in step S300 are mapped with respective predetermined specific addresses in the first to third regions A to C defined in step S100, by the data mapping unit 400 (S400). In this case, it is preferable that the respective specific addresses in the first to third regions A to C defined in step S100 are addresses located in the same order.

Next, the first to third segments of 8-bit data divided in step S300 are stored in the addresses of the 8-bit memory device 100 mapped with the respective specific addresses in the first to third regions A to C defined in step S100, by the control unit 500 (S500).

That is, the first 8-bit data of 24-bit data to be stored is stored in the first region A, the second 8-bit data of 24-bit data to be stored is stored in the second region B, and the third 8-bit data of 24-bit data to be stored is stored in the third region C.

Meanwhile, when the data stored in the 8-bit memory device 100 is read as described above, the original 24-bit data is restored by the data restoration unit 600 by combining the first to third segments of 8-bit data stored in the addresses of the 8-bit memory device 100 mapped with the respective specific addresses in the first to third regions A to C defined in step S100, and then the read operation may be performed.

The data access apparatus using a memory device according to the embodiment of the present disclosure is preferably applied to the solar inverter system, but present disclosure is not limited thereto. For example, the data access apparatus may be applied to all of electronic control unit and systems that may access data to memories on the basis of control modules.

In addition, the embodiment of the present disclosure is realized such that 24-bit data may be read or written from or in one 8-bit memory device, but the present disclosure is not limited thereto. For example, the present disclosure may be embodied such that the large volume of data (e.g. 32 bits, 64 bits, or 128 bits) is read or written from or in one memory device including a small capacity (e.g. 16 bits, 32 bits, or 64 bits).

For example, the present disclosure may be embodied such that 16-bit data is divided into two parts to be read or written from or in one 8-bit memory device, or 32-bit data is divided into four parts to be read or written from or in one 8-bit memory device. That is, the present disclosure may be embodied such that 16-bit or more data is read or written from or in one 8-bit memory device. Meanwhile, the present disclosure may be embodied such that the large volume of data (e.g. 32 bits, 64 bits, or 128 bits) is read or written from or in a 16-bit or more memory device, similarly to the 8-bit memory device. The specific realization method thereof may be performed similarly to the above-mentioned embodiment of the present disclosure.

Meanwhile, the data access apparatus using a memory device according to the embodiment of the present disclosure can be embodied by computer-readable codes in computer-readable recording media. The computer-readable recording media include all recording media in which computer-readable data is stored.

For example, the computer-readable recording media include a ROM, a RAM, a CD-ROM, a magnetic tape, a hard disk, a floppy disk, a movable storage device, a flash memory, and an optical storage device.

In addition, the computer-readable recording media are distributed by computer systems connected through communication network, and may be stored as codes readable in the distribution manner and executed by the codes.

In accordance with the data access apparatus using a memory device of some embodiments of the present disclosure, it is possible to easily read/write 16-bit or more data using one 8-bit memory device. Consequently, it is possible to effectively access the large volume of data to the memory device which is cheap and has a small capacity, and to effectively reduce costs.

As is apparent from the above description, a data access apparatus using a memory device of some embodiments of the present disclosure can allow 16-bit or more data to be easily read/written using one 8-bit memory device. Consequently, it is possible to effectively access a large volume of data to the memory device which is cheap and has a small capacity, and to effectively reduce costs.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Although the data access apparatus using a memory device according to some embodiments of the present disclosure has been described with respect to the illustrative embodiments, it will be apparent to those skilled in the art that various variations and modifications may be made without departing from the spirit and scope of the disclosure as defined in the following claims.

What is claimed is:

1. A data access apparatus using a memory device configured to map addresses, wherein the data access apparatus includes a processor and comprises:

a single 8-bit memory device including a plurality of addresses configured to access data;

an address mapping unit, executing on the processor, configured to divide the single 8-bit memory device into three parts by dividing the plurality of addresses of the single 8-bit memory device into a first region, a second region, and a third region having consecutive addresses respectively, and to map the plurality of addresses of the single 8-bit memory device to respective predetermined addresses in the first to third regions such that they one-to-one correspond to each other;

a data division unit, executing on the processor, configured to divide 24-bit data into the first to third segments of data, wherein the first segment is defined as high-order 8-bit data, the second segment is defined as middle-order 8-bit data, and the third segment is defined as low-order 8-bit data;

a data mapping unit, executing on the processor, configured to map the high-order 8-bit data with the predetermined addresses in the first region, the middle-order 8-bit data with the predetermined addresses in the second region, and the low-order 8-bit data with the predetermined addresses in the third region;

a control unit, executing on the processor, configured to control the first to third segments of data such that each of the first to third segments of data are stored in the plurality of addresses of the single 8-bit memory device mapped to each of the predetermined addresses located respectively in the first to third regions, wherein each of the predetermined addresses in which the first to third segments of data are stored are located in same order in each of the first to third regions respectively such that intervals of each of the predetermined addresses located respectively in the first to third regions are the same.

2. The data access apparatus according to claim 1, further comprising a data restoration unit, executing on the processor, configured to restore an original 24-bit data by combining the first to third segments of data stored in the plurality of addresses of the single 8-bit memory device mapped with the predetermined addresses in the first to third regions.

3. The data access apparatus according to claim 1, wherein the address mapping unit is further configured to divide the plurality of addresses of the single 8-bit memory device into the three parts according to a setting of a user so that the three parts are defined as the first to third regions.

* * * * *